June 10, 1958 W. A. THOMAS 2,838,179
MAGNETIC FILTERS
Filed Dec. 2, 1955 3 Sheets-Sheet 1

INVENTOR.
William A. Thomas
BY
Robert H. Wendt
Attorney

June 10, 1958 W. A. THOMAS 2,838,179
MAGNETIC FILTERS
Filed Dec. 2, 1955 3 Sheets-Sheet 2

INVENTOR.
William A. Thomas
BY Robert H. Wendt
Attorney

United States Patent Office 2,838,179
Patented June 10, 1958

2,838,179

MAGNETIC FILTERS

William A. Thomas, Chicago, Ill., assignor to Marvel Engineering Company, Chicago, Ill., a corporation of Illinois Application December 2, 1955, Serial No. 550,635

7 Claims. (Cl. 210—223)

The present invention relates to magnetic filters, and is particularly concerned with improved filters adapted to remove all particles or metals having magnetic qualities from a fluid passing through the filter.

One of the objects of the invention is the provision of an improved filter which operates with certainty in the removal of subsantially all of the metallic filings, particles, or dust which has magnetic qualities, from any fluid medium passing through the filter.

Another object of the invention is the provision of an improved filter which is provided with magnetic members for attracting and retaining all foreign matter of a magnetic nature, such as steel, iron particles, filings, dust, and including any other metals having magnetic qualities.

Another object of the invention is the provision of an improved filter with a multiplicity of magnetic separators which are adapted to attract metallic duct or particles of a magnetic material to keep such dust or particles away from the filter screen and to maintain the efficiency of the filter screen, which is employed for also separating all other particles of a non-metallic nature.

Another object of the invention is the provision of an improved filter having such provision for separating particles of a magnetic nature and additional provision for separating particles of a non-magnetic nature, thus covering entirely the field of such materials which are to be separated from a fluid.

Another object of the invention is the provision of an improved filter which is simple in construction, efficient, and which has a minimum back resistance to flow, and which maintains its efficiency over a long period of time.

Another object of the invention is the provision of an improved magnetic filter of the class described, in which the magnets are quickly detachable or attachable so that any broken magnets may be readily replaced.

Another object of the invention is the provision of an improved magnetic cage adapted to be located about a filter unit, and including a multiplicity of longitudinally extending members which are magnetized transversely and have their opposite poles located opposite each other so that the flux from the diametrically magnetized magnets extends from magnet to magnet about the full periphery of the filter unit over an area which is substantially as long as the magnets.

Other objects and advantages of the invention will be apparent from the following description and the accompanying drawings, in which similar characters of reference indicate similar parts throughout the several views.

Referring to the three sheets of drawings accompanying this specification,

Fig. 7 is a side elevational view of one of the detachable magnets of this assembly.

Figure 1:
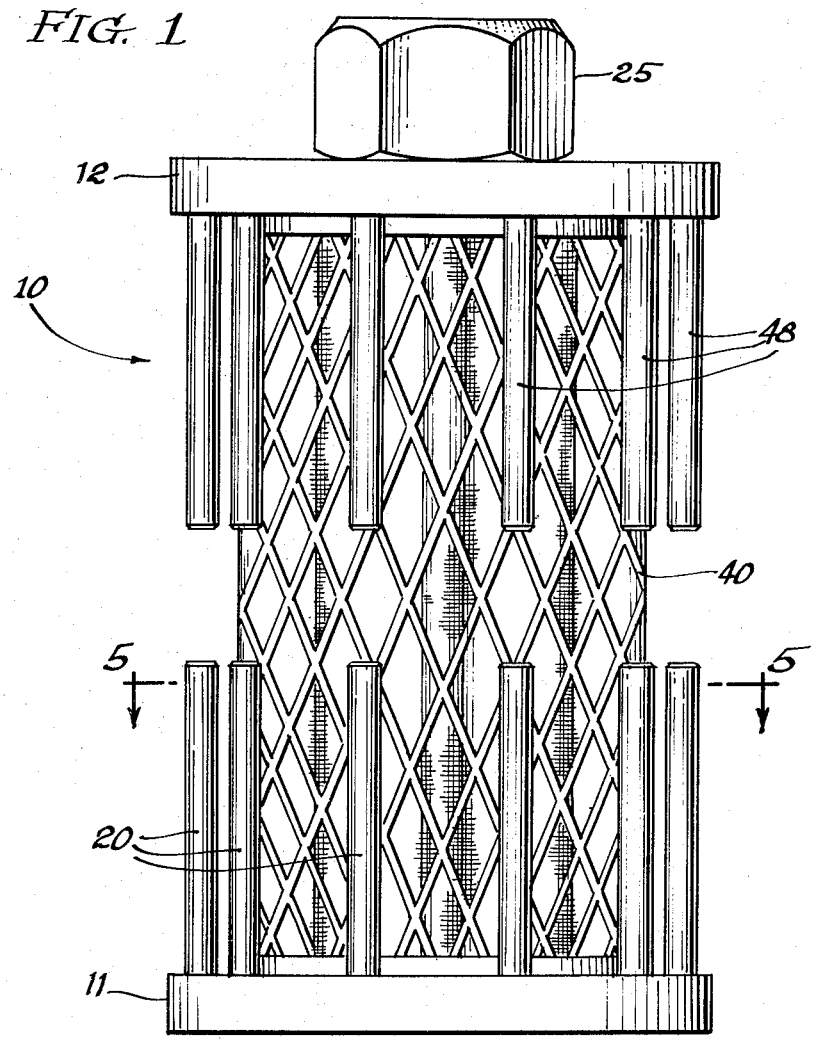
Fig. 1 is a side elevational view of a magnetic filter embodying the invention.
Figure 2:
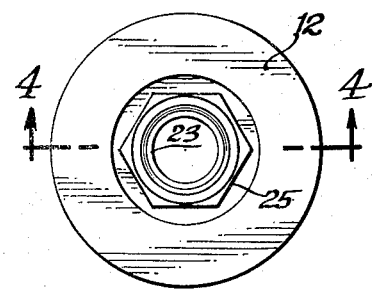
Fig. 2 is a top plan view on a smaller scale.
Figure 3:
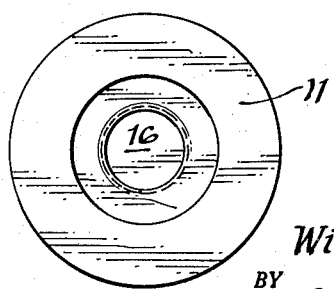
Fig. 3 is a bottom plan view.
Figure 4:
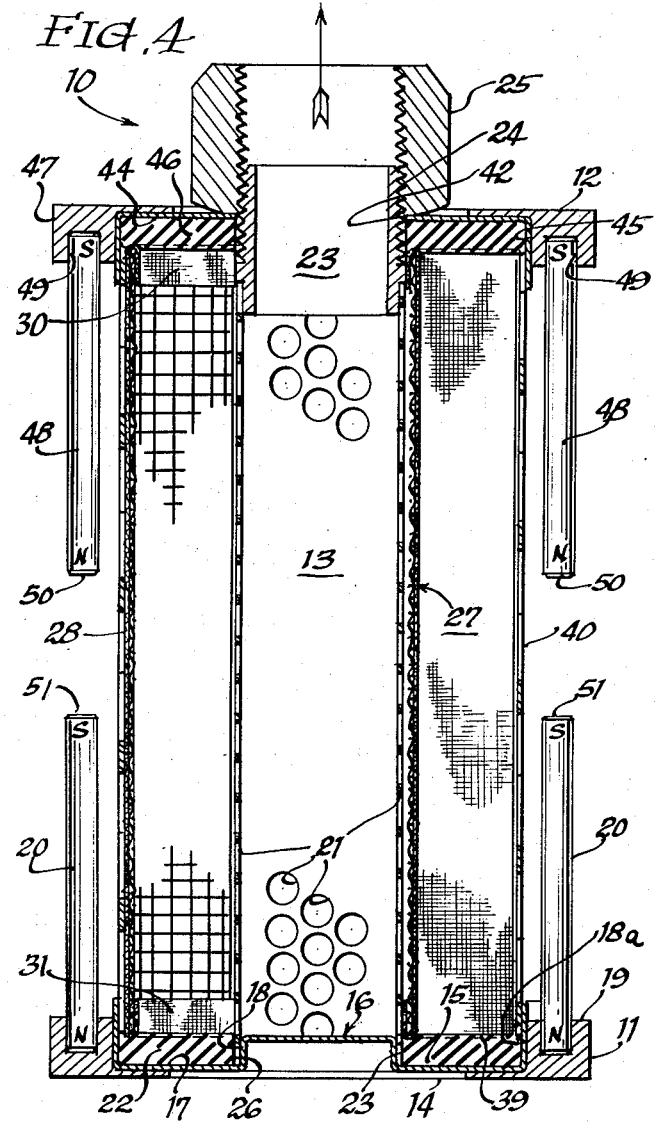
Fig. 4 is a vertical sectional view taken on the plane of the line 4—4 of Fig. 2.

Referring to the drawings, 10 indicates in its entirety an improved filter embodying the invention, the frame of which preferably includes a bottom plate 11, a top plate 12, and a perforated tube 13 for supporting the rest of the elements of the filter.

The bottom plate 11 may comprise a sheet metal stamping of magnetic metal, such as soft iron having a plane bottom 14 formed with a central cup shaped depression 18 of cylindrical shape for providing an upwardly extending cylindrical boss 16 on the inside.

The bottom plate 11 may include an annular magnet support 19. The magnet support 19 has an annular shoulder 18a and an upwardly extending annular rim portion for supporting a multiplicity of magnets 20.

The inner annular shoulder 18 is adapted to support the perforated tube, which is preferably formed of a rectangular sheet of magnetic metal provided with a multiplicity of perforations 21 and formed into a cylinder by having its overlapping edges welded together.

The perforated tube 13 fits about the cylindrical shoulder 18 on the cylindrical boss 16 to which to may be welded. At its upper end the perforated tube 13 carries a cylindrical tube 23 provided with pipe threads 24 on its outside for receiving an internally threaded nipple or nut 25.

The magnets 20 are preferably shorter than half the distance between the top and bottom of the filter 10; and the magnets preferably comprise a multiplicity of cylindrical rods of suitable magnetic metal of high magnetic qualities.

The magentic rods are frictionally secured by being driven tightly into cylindrical sockets formed in the annular rim 19 of the bottom plate. The bottom plate 11 is thus formed with an annular groove adapted to receive and frictionally hold a resilient, non-metallic gasket member 22, which may be made of soft rubber, having a thick edge 23 of cylindrical shape, upper and lower plane surfaces of annular shape, and a central aperture 26 of cylindrical shape.

The rubber gasket 22 is adapted to fit in the cup-shaped depression 17 about the upwardly projecting boss 16, forming a resilient gasket for engaging the lower end of certain filter elements.

The annular shoulder 18a about the rubber gasket 22 is adapted to retain a cylindrical screen frame and a corrugated screen, both of which fit inside the annular shoulder 18a about the perforated tube 13.

The filter element 27 comprises a rectangular strip of fine screen 28 mounted on a coarse wire mesh member 29; and the screen is made longer than the coarse wire in an axial direction and provided with end portions 30 and 31 folded over the coarse screen.

The assembly of fine screen and coarse screen then forms a roughly cylindrical filter element 27, which has a multiplicity of outer bends 32 joined by radial portions 33 to a multiplicity of inner bends 34.

The assembly of fine screen and coarse screen has its ends 35, 36 secured together by a multiplicity of spot welds on overlapping radial portions 33, thus forming a generally cylindrical filter element with radially inwardly and outwardly extending portions.

This filter element has a central aperture that fits about the perforated tube 13; and the edges of the outer bends 32 are adapted to fit inside the inner shoulder 18 of the bottom plate 11. The filter element 27 is thus adapted to fit about the perforated tube 13 inside the annular shoulder 18 on the bottom plate 11; and the filter element is engaged at its lower sinuous edge 39 by the soft rubber gasket 22, effecting a liquid seal at this point.

For mechanical protection the filter element 27 is preferably surrounded by a coarsely perforated mesh fabric housing 40, such as one made by slitting a sheet of metal at alternate points and causing it to expand into an expanded fabric.

The mesh fabric housing 40 comprises a rectangular sheet formed into a cylinder and having its overlapping edges spot welded together at a plurality of points 41, forming a perforated cylinder 40 for protection of the finer mesh fabric filter.

At its upper end the filter 10 is provided with the top plate 12, having a central aperture 42 adapted to receive the threaded end 24 of the perforated tube 23, which projects outwardly a sufficient distance to receive the threaded nut, which clamps the top and bottom plates together and also serves to connect the perforated tube 13 to a source of suction.

The top plate 12 has an annular chamber 44 with an outer cylindrical wall 45 for receiving the soft rubber gasket 46 similar to the gasket 22 previously described. The top plate 12 has an annular edge portion 47 of sufficient thickness to support a multiplicity of upper magnets 48, each having a tight fit in a cylindrical socket 49.

The ends of the magnets 48 are preferably spaced from the ends of the magnets 20, presenting adjacent but opposite poles, either of which may be north provided the other is south; and the number of magnets is preferably equal on the top plate 12 to those on the bottom plate 11 so that each magnet has a pole of opposite polarity opposite an adjacent pole.

The magnetic circuit extends from the adjacent poles 50, 51 outward toward both ends of the unit, inward on the top and bottom plates 11 and 12, and may be completed by the central tube 13, which is also a magnetic material.

The upper edges of the mesh fabric housing 40 and the filter element 27 are engaged by the upper rubber gasket 46, which gives sufficiently to engage the filter element at all points on its end; and the mesh fabric housing may project into the soft rubber gasket or into the space between the gasket and the annular chamber 44 so that the gaskets close both ends of the filter element 27.

The top plate 12 fits over the threaded portion 24 on cylindrical tube 23; and the nipple or nut 25 clamps the two end plates with their rubber gaskets against the ends of the filter element 27 and mesh fabric 40, leaving sufficient threads inside the nut 25 for attachment to a pipe.

The operation of the present filter element is as follows: All particles of a magnetic nature in the liquid to be filtered must pass through the fields of the adjacent magnets so that all magnetic particles are immediately attracted to the magnets and caused to adhere to the free poles of the magnets.

Thus all material of a magnetic nature is immediately separated from the liquid or fluid; and the particles of a non-magnetic nature are separated by the fine screen of the filter element 27.

Thus the magnets serve to keep the screen free of particles of a magnetic nature; and the present device is adapted to separate both magnetic and nonmagnetic materials from any fluid passing through it.

The present magnetic separator members are adapted to clear any fluid of magnetic particles before it passes through the screen, thus maintaining the screen more free and preventing its clogging with such materials.

Figure 6:
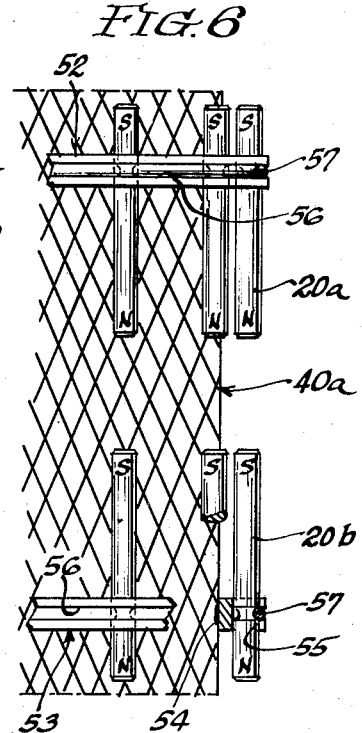
Fig. 6 is a fragmentary elevational view of another form of housing and magnet support, which may be utilized in Fig. 1.
Figure 2:
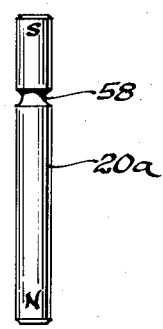
Figure 5:
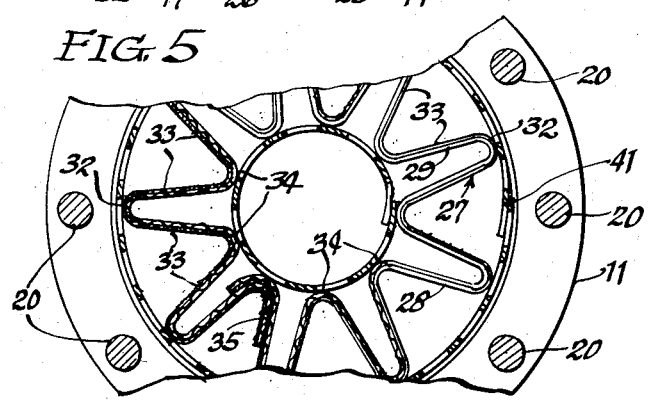
Fig. 5 is a horizontal sectional view taken on the plane of the line 5—5 of Fig. 1.

Referring to Fig. 6, this is a side elevational view of a modification showing an improved expanded metal housing and detachable magnets, which permits their ready replacement in case of breakage. The expanded metal housing 40a is of the same construction as that previously described, except that it has a pair of annular magnet supporting rings 52 and 53 spot welded to the expanded metal adjacent each end.

Each of the rings 52, 53 has a central opening 54 and is provided with the radially extending magnet slots 55 at regularly spaced points about its periphery. These slots 55 may be round on one side at the base of the slot; and the parallel sides of the slot are adapted to receive the magnets 20a and 20b.

The rings 52 and 53 each have a peripherally extending slot 56 of sufficient size to receive a resilient rubber O ring 57. The magnets 20a and 20b may each be provided with a peripherally extending annular groove 58 for receiving and retaining the O ring 57. The O ring is of smaller size than the metal rings 52 and 53; that is, of smaller diameter and smaller periphery, so that each O ring must be stretched to be placed in the groove 56, where it engages in the grooves 58 of the magnets and holds the magnets in fixed position in the slots 55.

Thus the magnets are readily removable and replaceable. The rings 52 and 53 and mesh fabric housing 40a are preferably made of steel or other paramagnetic metal so that the magnetic circuit may be completed from the magnets through the housing 40a.

Figure 8:
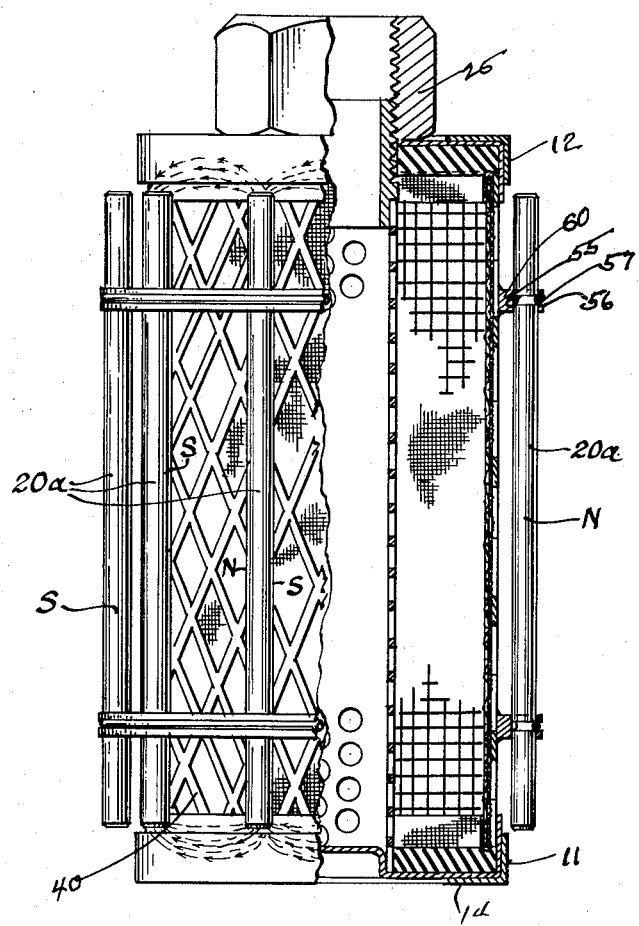
Fig. 8 is a side elevational view in partial section of a modification similar to Fig. 6 in which the rods are diametrically polarized.

Referring to Fig. 8, this is an elevational view of a modification, in partial section, in which the expanded metal housing 40 is provided with the spaced rings 60, which are provided with peripheral slots 56 for receiving rubber ring 57 and with the radially extending grooves 55 for receiving the magnets, which are held in place by the elastic rubber O ring 57.

In this case the magnets 20a may extend from top to bottom of the housing 40; but the magnets are polarized or magnetized in a diametrical direction from one cylindrical side to the other cylindrical side. The magnets are then arranged so that a south pole, indicated at S, is opposite a north pole, in Fig. 8, as shown; and the lines of flux will extend between the rods all the way from the top to the bottom of the rods, completely covering the external surface of the filter unit with lines of flux that will attract metal particles and filings.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a magnetic filter attachment, the combination of a filter housing of perforated metal of substantially cylindrical shape, with a pair of annular metal members secured adjacent the ends of said housing, said annular metal members having a multiplicity of slots for receiving bar magnets, a plurality of bar magnets in said slots and extending toward each other with opposite poles adjacent each other from the two annular members, and means for holding said bar magnets detachably in said slots for convenient replacement, comprising an elastic endless member located in a peripheral groove in each annular member and engaging in a groove in each magnet.

2. In a magnetic filter attachment for a filter having an outer foraminous housing for passing liquid to be filtered, said housing having a pair of metal rings secured to the housing with the rings spaced from each other, said rings having a multiplicity of radial slots, and a multiplicity of permanent magnet rods extending from end to end of said housing and located in said slots forming a cage about the filter housing, the said rods being magnetized diametrically and presenting a multiplicity of lateral polarized portions, side by side, causing a magnetic field between the rods from end to end of the housing for attracting and separating from the liquid all magnetic particles before the liquid enters the filter.

3. In a magnetic filter attachment for a filter having an outer foraminous housing for passing liquid to be filtered, said housing having a pair of metal rings secured to the housing with the rings spaced from each other, said rings having a multiplicity of radial slots, and a multiplicity of permanent magnet rods extending from end to end of said housing and located in said slots forming a cage about the filter housing, the said rods being magnetized diametrically and presenting a multiplicity of lateral polarized portions, side by side, causing a magnetic field between the rods from end to end of the housing for attracting and separating from the liquid all magnetic particles before the liquid enters the filter, the said rings each being provided with a peripherally extending endless non-metallic elastic member holding the rods in the slots in said rings.

4. In a magnetic filter attachment for a filter having an outer foraminous housing for passing liquid to be filtered, said housing having a pair of metal rings secured to the housing with the rings spaced from each other, said rings having a multiplicity of radial slots, and a multiplicity of permanent magnet rods extending from end to end of said housing and located in said slots forming a cage about the filter housing, the said rods being magnetized diametrically and presenting a multiplicity of lateral polarized portions, side by side, causing a magnetic field between the rods from end to end of the housing for attracting and separating from the liquid all magnetic particles before the liquid enters the filter, and said rings each being provided with a peripherally extending endless non-metallic elastic member holding the rods in the slots in said rings, said rings each having a peripherally extending groove on its outer surface for receiving said elastic member.

5. In a magnetic filter attachment for a filter having an outer foraminous housing for passing liquid to be filtered, said housing having a pair of metal rings secured to the housing with the rings spaced from each other, said rings having a multiplicity of radial slots, and a multiplicity of permanent magnet rods extending from end to end of said housing and located in said slots forming a cage about the filter housing, the said rods being magnetized diametrically and presenting a multiplicity of lateral polarized portions, side by side, causing a magnetic field between the rods from end to end of the housing for attracting and separating from the liquid all magnetic particles before the liquid enters the filter, and said rings each being provided with a peripherally extending endless non-metallic elastic member holding the rods in the slots in said rings, said rings each having a peripherally extending groove on its outer surface for receiving said elastic member, the depths of the radial slots in said rings being sufficient to locate said rods with their outer surface inside the base of the peripherally extending groove.

6. In a magnetic filter attachment for a filter having an outer foraminous housing for passing liquid to be filtered, said housing having a pair of metal rings secured to the housing with the rings spaced from each other, said rings having a multiplicity of radial slots, and a multiplicity of permanent magnet rods extending from end to end of said housing and located in said slots forming a cage about the filter housing, the said rods being magnetized diametrically and presenting a multiplicity of lateral polarized portions, side by side, causing a magnetic field between the rods from end to end of the housing for attracting and separating from the liquid all magnetic particles before the liquid enters the filter, the said rings each being provided with a peripherally extending endless non-metallic elastic member holding the rods in the slots in said rings, said rings each having a peripherally extending groove on its outer surface for receiving said elastic member, the depths of the radial slots in said rings being sufficient to locate said rods with their outer surface inside the base of the peripherally extending groove, and said endless member comprising a rubber O-ring tensioned about said rods.

7. A magnetic filter attachment according to claim 1, in which the bar magnets are polarized diametrically transversely to the length of the bars with opposite poles adjacent each other so that lines of flux extend peripherally about the filter housing in a direction transverse to the length of the bar magnets.

References Cited in the file of this patent

UNITED STATES PATENTS

| 2,014,800 | Deguenther | Sept. 17, 1935 |
| 2,117,361 | Rohrback | May 17, 1938 |
| 2,149,764 | Frei | May 7, 1939 |
| 2,392,624 | Tunis | Jan. 8, 1946 |
| 2,789,655 | Michael et al. | Apr. 23, 1957 |

FOREIGN PATENTS

| 562,175 | Great Britain | June 21, 1944 |